US008542638B2

(12) United States Patent
Moelker et al.

(10) Patent No.: US 8,542,638 B2
(45) Date of Patent: Sep. 24, 2013

(54) SYSTEM AND METHOD FOR INTERFERENCE IDENTIFICATION AND FREQUENCY ALLOCATION

(75) Inventors: Dignus-Jan Moelker, Voorhout (NL); Robertus Cornelis Wilhelmus Lansbergen, Amsterdam (NL)

(73) Assignee: Microchip Technology Incorporated, Chandler, AZ (US)

( * ) Notice: Subject to any disclaimer, the term of this patent is extended or adjusted under 35 U.S.C. 154(b) by 1036 days.

(21) Appl. No.: 12/297,828

(22) PCT Filed: Apr. 20, 2007

(86) PCT No.: PCT/EP2007/053876
§ 371 (c)(1),
(2), (4) Date: Oct. 20, 2008

(87) PCT Pub. No.: WO2007/122188
PCT Pub. Date: Nov. 1, 2007

(65) Prior Publication Data
US 2009/0097445 A1    Apr. 16, 2009

(30) Foreign Application Priority Data
Apr. 20, 2006  (NL) .................................... 1031641

(51) Int. Cl.
*H04W 72/04* (2009.01)
(52) U.S. Cl.
USPC ......................................................... 370/329
(58) Field of Classification Search
USPC ................. 370/241, 252, 310, 328, 329, 338; 375/346; 455/63.1, 67.13
See application file for complete search history.

(56) References Cited

U.S. PATENT DOCUMENTS

| | | | | |
|---|---|---|---|---|
| 5,048,057 A | * | 9/1991 | Saleh et al. | 375/267 |
| 6,130,907 A | * | 10/2000 | Chen | 370/342 |
| 6,359,901 B1 | * | 3/2002 | Todd et al. | 370/465 |
| 6,442,384 B1 | * | 8/2002 | Shah et al. | 455/423 |
| 6,606,496 B1 | * | 8/2003 | Salvarani et al. | 455/436 |
| 6,697,013 B2 | * | 2/2004 | McFarland et al. | 342/159 |
| 6,704,378 B2 | * | 3/2004 | Jagger et al. | 375/346 |
| 6,941,110 B2 | * | 9/2005 | Kloper et al. | 455/67.11 |
| 7,107,032 B2 | * | 9/2006 | Li | 455/296 |
| 7,129,884 B1 | * | 10/2006 | Tehrani et al. | 342/20 |
| 7,149,205 B2 | | 12/2006 | Nakamura et al. | |

(Continued)

FOREIGN PATENT DOCUMENTS

| | | |
|---|---|---|
| EP | 1515488 | 3/2005 |
| JP | 2002-353878 | 12/2002 |

(Continued)

OTHER PUBLICATIONS

International Search Report PCT/EP2007/053876; Dated Aug. 6, 2007.

*Primary Examiner* — Chi Pham
*Assistant Examiner* — Robert Lopata
(74) *Attorney, Agent, or Firm* — Kevin L. Daffer; Daffer McDaniel LLP

(57) ABSTRACT

A system for interference detection and identification, as well as frequency allocation is described. It contains interference detection means for detecting interference on wireless radio frequencies. The interference detection means comprising discrimination means for discriminating between interference caused by a Wireless Local Area Network (WLAN) and interference caused by other radio applications. The system does not allocate the frequencies associated with WLANs for use.

3 Claims, 12 Drawing Sheets

(56) References Cited

U.S. PATENT DOCUMENTS

| | | | |
|---|---|---|---|
| 7,260,361 B2 * | 8/2007 | Jacobsen | 455/63.1 |
| 7,363,008 B2 * | 4/2008 | Hassan et al. | 455/63.1 |
| 7,373,162 B2 * | 5/2008 | Farnham et al. | 455/522 |
| 7,424,268 B2 * | 9/2008 | Diener et al. | 455/62 |
| 7,515,935 B2 * | 4/2009 | Ibrahim et al. | 455/553.1 |
| 7,554,965 B2 * | 6/2009 | Karaoguz | 370/342 |
| 7,599,686 B2 * | 10/2009 | Quinn et al. | 455/423 |
| 7,643,460 B2 * | 1/2010 | Bajic | 370/338 |
| 7,643,811 B2 * | 1/2010 | Reunamaki et al. | 455/226.2 |
| 7,929,508 B1 * | 4/2011 | Yucek et al. | 370/338 |
| 7,933,566 B2 * | 4/2011 | Li et al. | 455/115.1 |
| 7,945,209 B2 * | 5/2011 | Grushkevich et al. | 455/41.2 |
| 8,023,599 B2 * | 9/2011 | Tanaka et al. | 375/347 |
| 8,204,445 B2 * | 6/2012 | Wood | 455/67.11 |
| 2003/0125019 A1 * | 7/2003 | Bajikar | 455/420 |
| 2004/0203826 A1 | 10/2004 | Sugar et al. | |
| 2005/0117676 A1 * | 6/2005 | Liu | 375/346 |
| 2005/0272436 A1 * | 12/2005 | Trott et al. | 455/450 |
| 2006/0089103 A1 * | 4/2006 | Osburn | 455/67.13 |
| 2006/0171327 A1 * | 8/2006 | Durand et al. | 370/252 |
| 2007/0183338 A1 * | 8/2007 | Singh et al. | 370/252 |
| 2008/0057967 A1 * | 3/2008 | Goldsmith | 455/447 |
| 2009/0296647 A1 * | 12/2009 | Friday et al. | 370/329 |

FOREIGN PATENT DOCUMENTS

| | | |
|---|---|---|
| JP | 2005-523616 | 8/2005 |
| WO | 9710553 | 3/1997 |
| WO | 03001742 | 1/2003 |
| WO | 03/090037 | 10/2003 |
| WO | 03090037 | 10/2003 |

* cited by examiner

SYSTEM AND METHOD FOR INTERFERENCE IDENTIFICATION AND FREQUENCY ALLOCATION

BACKGROUND OF THE INVENTION

1. Technical Field

The present invention relates to a system and a method for interference detection and identification as well as frequency allocation for wireless systems.

2. Description of Related Art

The license-free 2.4 GHz ISM band is crowded with radio applications. Examples are WLAN, Bluetooth, cordless phones, microwave ovens, etc. Interference to other systems, and vice versa, is a well-known problem in this band.

A system requiring high reliability for its own quality of service, as well as a good co-existence with other systems must choose a set of frequencies that are unused at that particular time, in that particular area. This is known in the art as dynamic/automatic channel allocation, or dynamic/automatic frequency allocation.

The issue of dynamic channel allocation (DCA) is a known problem for over 30 years. DECT is one of the most widespread systems using DCA. DCA is very effective within one particular system.

Adaptive frequency hopping (AFH) is another example of known art. Such systems adapt their allowed frequency table on the basis of prior success to communicate on particular frequencies. In version 1.2, the Bluetooth SIG has adopted AFH.

It is important to prevent the selection of nearby used Wireless Local Area Network (WLAN) frequencies. This is due to the 'vulnerability' of WLAN to interference in combination with the widespread success of the technology. WLANs consist of one access point (AP) and associated wireless stations (STA). The AP transmits a beacon as part of its air interface protocol. Without data transmissions taking place, the beacon remains as the only detectable presence in the WLAN, similar to a heartbeat. This is illustrated in FIG. 1, showing the WLAN beacon as a function of time. It should be noted that the interbeacon interval is shown condensed. WLAN deploys such a beacon with a duty cycle of the order of 1%. In most WLAN access points in the market today, a beacon is transmitted about every 100 ms. The length of the beacon packet normally varies around 1 ms, depending on the amount of content actually being transferred. In a practical system, interbeacon arrival times may show some irregularity. A complication is that WLAN uses the listen-before-talk principle (carrier sense multiple access—CSMA, or more generally as Clear Channel Assessment). This means that a WLAN will not transmit when it sees other users at its operating frequency. For this reason, the use of frequencies interfering with a WLAN may completely block the communication between the AP and the STAs of the WLAN.

A known way to detect WLAN access points is the method used by programs such as "Netstumbler". This method is based on sending a request to access points (APs) and detecting the WLANs based on the replies of the APs. There are two disadvantages to this approach: 1) Some APs have a security feature, by which they will not reply to such requests, unless the request contains the correct Service Set IDentifier (SSID)—thus making them invisible. 2) A device is needed that is capable of transmissions compatible with (parts of) the WLAN PHY/MAC.

It is an object of the invention to provide an improved system and method for interference detection and identification.

SUMMARY OF THE INVENTION

This and other objects of the invention are achieved by a system, a method and a computer program according to the independent claim. Favorable embodiments are defined in the dependent claims.

According to an aspect of the invention a system for interference detection and identification, as well as frequency allocation for wireless systems is provided, containing interference detection means for detecting interference on wireless radio frequencies. The interference detection means comprising discrimination means for discriminating between interference caused by a WLAN and interference caused by other radio applications. In this way, frequencies associated with WLANs can be reliably identified and avoided. The system according to the invention does not require the presence of a WLAN compatible PHY/MAC. Furthermore it is able to discover all WLANs, also the secure ones.

Based on the interference detection and identification, the system may determine a set of allowed frequencies that may be used for frequency allocation. Frequencies clear of interference are added to the set of allowed frequencies. Interfered frequencies are added to this set only if no WLAN has been detected.

The system according to the present invention is optimized for, but not limited to, a digitally modulated non-frequency hopping wireless audio system. The bandwidth of this system allows N adjacent, non-overlapping frequencies. These N frequencies are all scanned. Scanning may be for a period of time, or continuously. The scanning process results in a table, containing the observed statistics. The statistics are processed for best frequency detection and allocation.

Frequency hoppers (FH) such as Bluetooth or cordless phones need not actively be avoided. FHs without adaptive frequency hopping (AFH) use the whole band, so there is no best or worst frequency. FH with AFH requires no avoidance, since those systems can avoid interference themselves.

Frequency hoppers are essentially narrowband transmissions, typically using 1 MHz bandwidth. Since they need not be avoided particularly, it is beneficial to not only measure total received power (interference) but also determine whether its source is narrowband or broadband. In case that the source is broadband it is determined that the interference comes from a WLAN.

According to a further embodiment the discriminating means are adapted for discriminating an interference caused by a WLAN-beacon. This may be done either by discriminating a repetition frequency of the WLAN-beacon or by discriminating a duration of the WLAN-beacon by means of a filter. In both cases the discrimination between interferences coming from a WLAN and from other applications is performed in a simple and reliable way.

According to a further aspect of the invention a method is provided for interference detection and identification, as well as frequency allocation for wireless systems comprising the following steps:
  detecting interference on wireless radio frequencies,
  discriminating between interference caused by a Wireless Local Area Network and interference caused by other radio applications.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Figure 1:
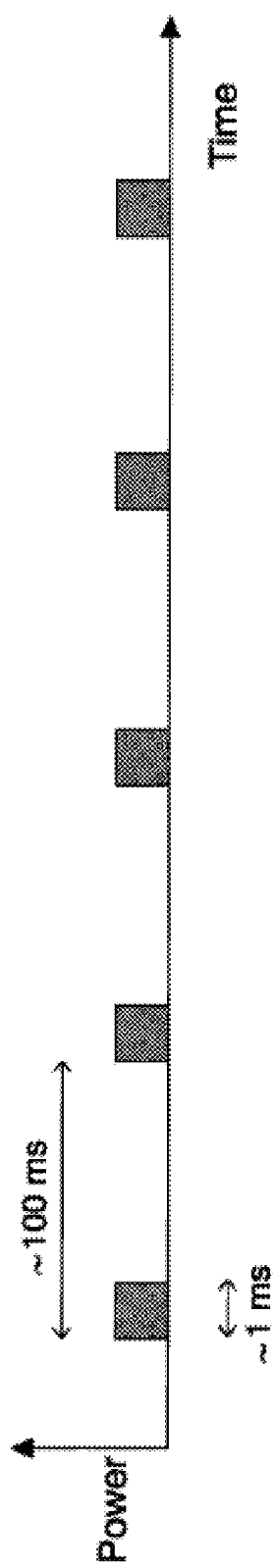
FIG. 1 illustrates a WLAN beacon as a function of time.
Figure 2:
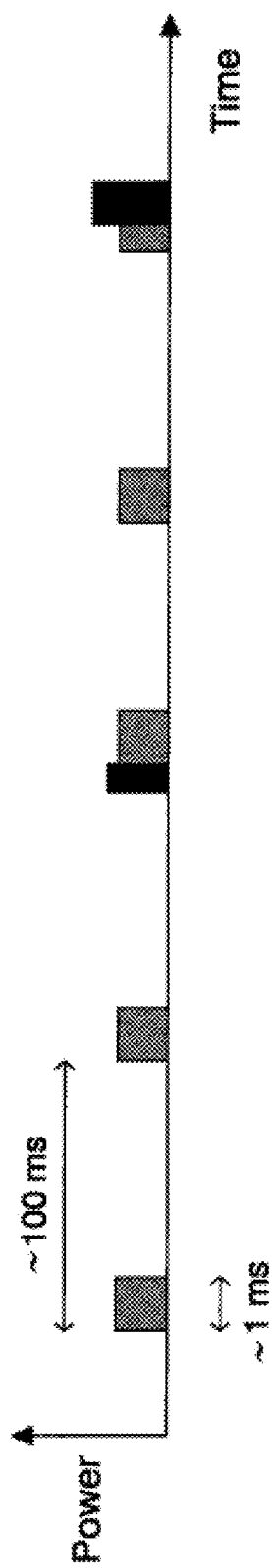
FIG. 2 shows a WLAN beacon being interfered.

An example of how a wideband power detector may respond over time to the simultaneous presence of a frequency hopper and a WLAN beacon is depicted in FIG. 2. FIG. 2 shows a WLAN beacon (gray) in interference illustration (black). The interbeacon interval is shown condensed compared to packet duration. The third beacon transmission is delayed due to the presence of interference. The last beacon is interfered. Based on information such as in FIG. 2, the system must be able to correctly deduce the presence of a WLAN.

General Flow

Figure 3:
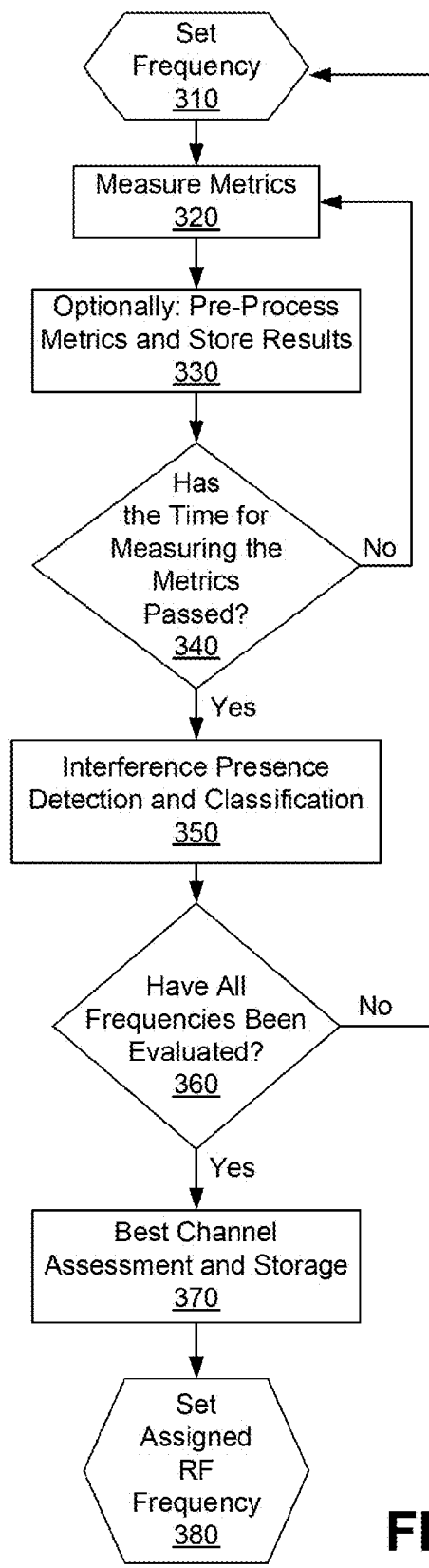
FIG. 3 shows a general flow diagram according to an embodiment of the invention.

The general flow of the entire process according to the invention is depicted in FIG. 3. The references in FIG. 3 have the following meaning:
310: Set Frequency
320: Measure Metrics
330: Optionally: Pre-process metrics and store results
340: Dwelling time passed?
350: Interference Presence Detection and Classification
360: All frequencies done?
370: Best Channel Assessment and Storage
380: Set assigned RF Frequency The frequency is set to the one to be tested (FUT—frequency under test). On this frequency, statistics, such as power and duration, are collected. Optionally, these statistics are pre-processed for the purpose of data storage reduction. After collecting for the intended time period for the FUT, the presence of interfering systems is identified, and their type (e.g. WLAN or not) is classified. The above is repeated for all frequencies, whereas finally a set of allowable frequencies is determined, and the best is assigned.

The system according to the present invention is preferably used in the 2400-2483.5 MHz-band. The frequency under test preferably is a 22 MHz wide frequency band.

This process need not necessarily be continuous or sequential. For instance, the information may be collected in between transmissions of the desired system, hence in intervals. Additionally, the process may be executed in parallel, for instance, if more than one radio front-end is available. The process in FIG. 3 uses batches. Processing can also be done iteratively, during the data collection period itself.

Measurement of Statistics

Figure 4:
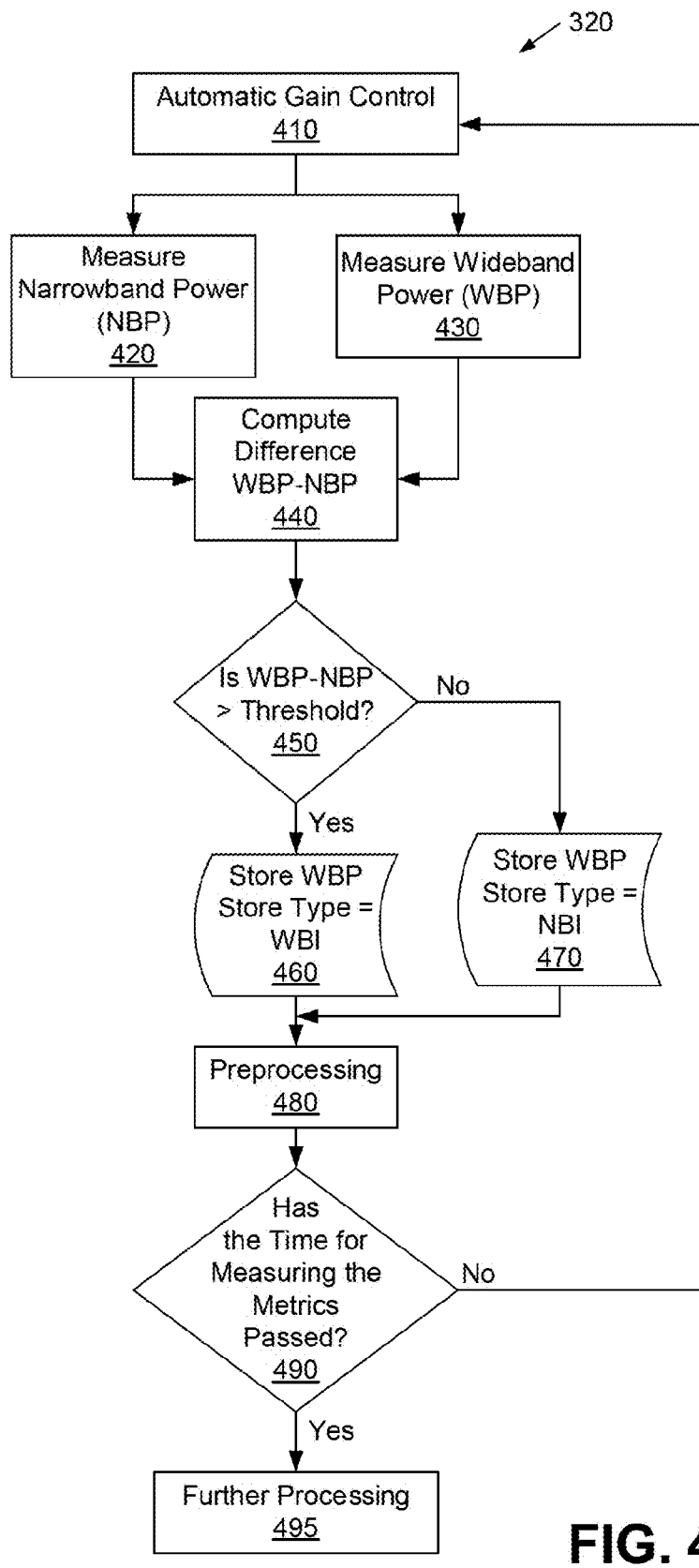
FIG. 4 shows an exemplary embodiment of a bandwidth discriminating power detector for use in the system according to the present invention.

The measurement of statistics may be designed according to FIG. 4. The references in FIG. 4 have the following meaning:
410: Automatic Gain Control
420: Measure Narrowband Power
430: Measure Wideband Power
440: WBP−NBP
450: >Threshold
460: Store WBP Store Type=WBI
470: Store WBP Store Type=NBI
480: Preprocessing
490: Dwelling time passed?
495: Further processing After automatic gain control (AGC), power is measured. AGC circuits may also produce a power measurement themselves.

In FIG. 4, both wideband power and narrowband power are measured. The effect of this for narrow and wide band interference (NBI, WBI, respectively) is:

|     | NBP      | WBP | WBP-NBP |
|-----|----------|-----|---------|
| NBI | 1        | 1   | 0       |
| WBI | 0 (or Low) | 1 | 1       |

Ratio of measured power and actual power versus measured interference type. 1 means that the actual power is measured. NBP and WBP stand for Narrow and Wide Band Power, respectively.

WBP represents the total power in the radio frequency (RF) bandwidth. NBP represents the aggregate power of all signals having a bandwidth substantially smaller than the RF bandwidth. Concrete examples are 11 MHz (−3 dB) WBP bandwidth, and 1 MHz (−3 dB) NBP bandwidth.

From the difference WBP−NBP, the type of interference may be deduced. In FIG. 4, this is done by means of a threshold comparison. In an alternative implementation, one may choose to ignore all narrowband interferers, because they do not point to WLANs. Subtraction (WBP−NBP) is one embodiment of the more general function f(WBP,NBP). The type of interference may for example also be deduced by using the ratio between WBP and NBP.

Power Measurement

Figure 5:
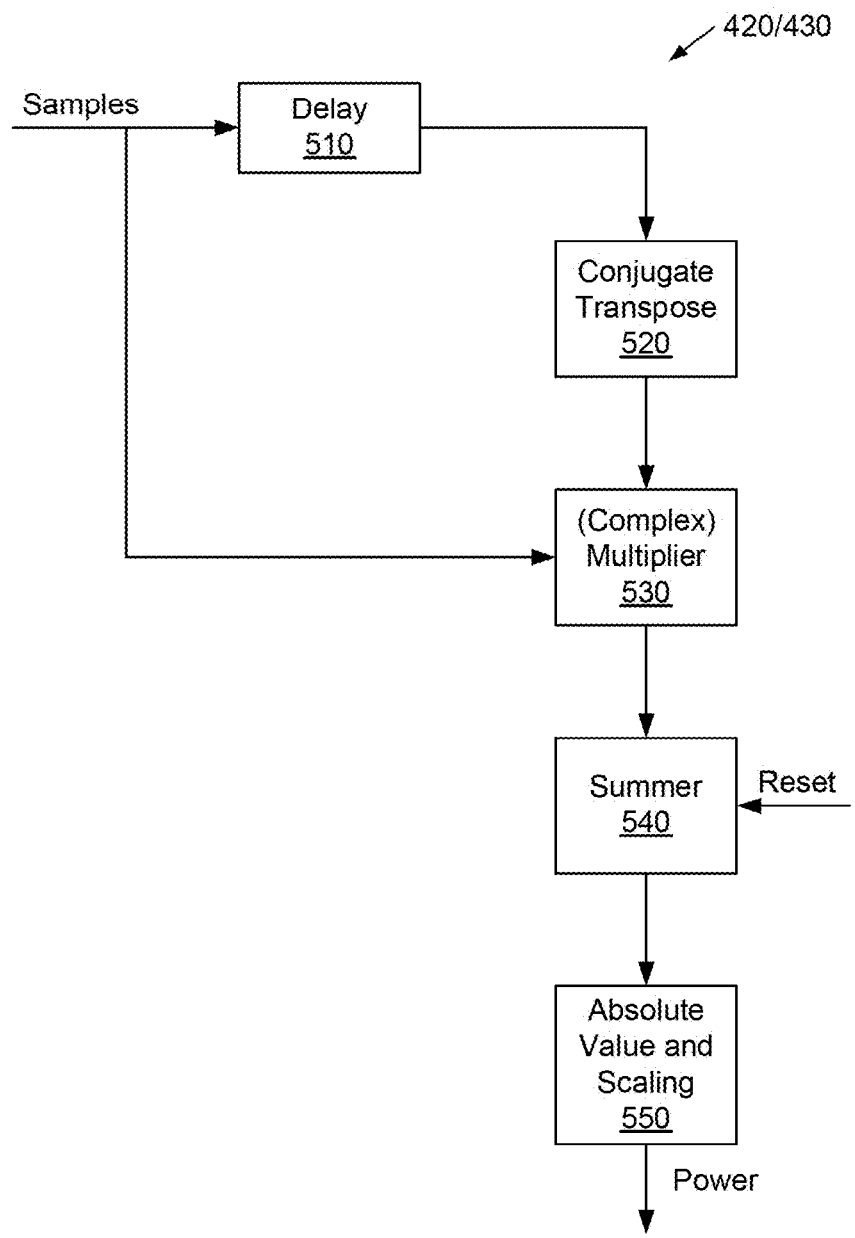
FIG. 5 shows an exemplary embodiment of a wideband/narrowband power measurement method/device for use in the system according to the present invention.

FIG. 5 provides an embodiment for a power measurement device. The references in FIG. 5 have the following meaning:
510: Delay
520: Conjugate Transpose
530: (Complex) multiplier
540: Summer
550: Absolute Value and Scaling Assuming a digital implementation, samples enter, are correlated over a delay time, and are summed over a period of time. Power is obtained by taking the absolute value and proper scaling. NBP is measured by setting the delay to a non-zero value, e.g. 1 μs. WBP is measured by setting the delay to 0. In more general terms, the delay value must be set in relation to the autocorrelation function of the respective signals. For narrow-band detection, the delay is set to a value larger than the main lobe of the autocorrelation function of the WLAN signal. For wide-band detection, the delay is set to a value smaller than this main lobe.

Several notes apply to FIG. 5. First, many methods exist to estimate power, both analog and digital. For example, in a digital implementation, the complexity of the multiplier may be reduced by techniques known in the art using absolute values. In analog implementations, the same general principles apply. Second, all gain stages operating on the signal prior to the measurement need to be compensated in order to obtain the received power at the antenna port.

Power measurements may be made more sensitive by means of antenna selection or antenna combination techniques. A person skilled in the art can apply these to improve the NBP/WBP power measurements.

Data Pre-processing

Figure 6:
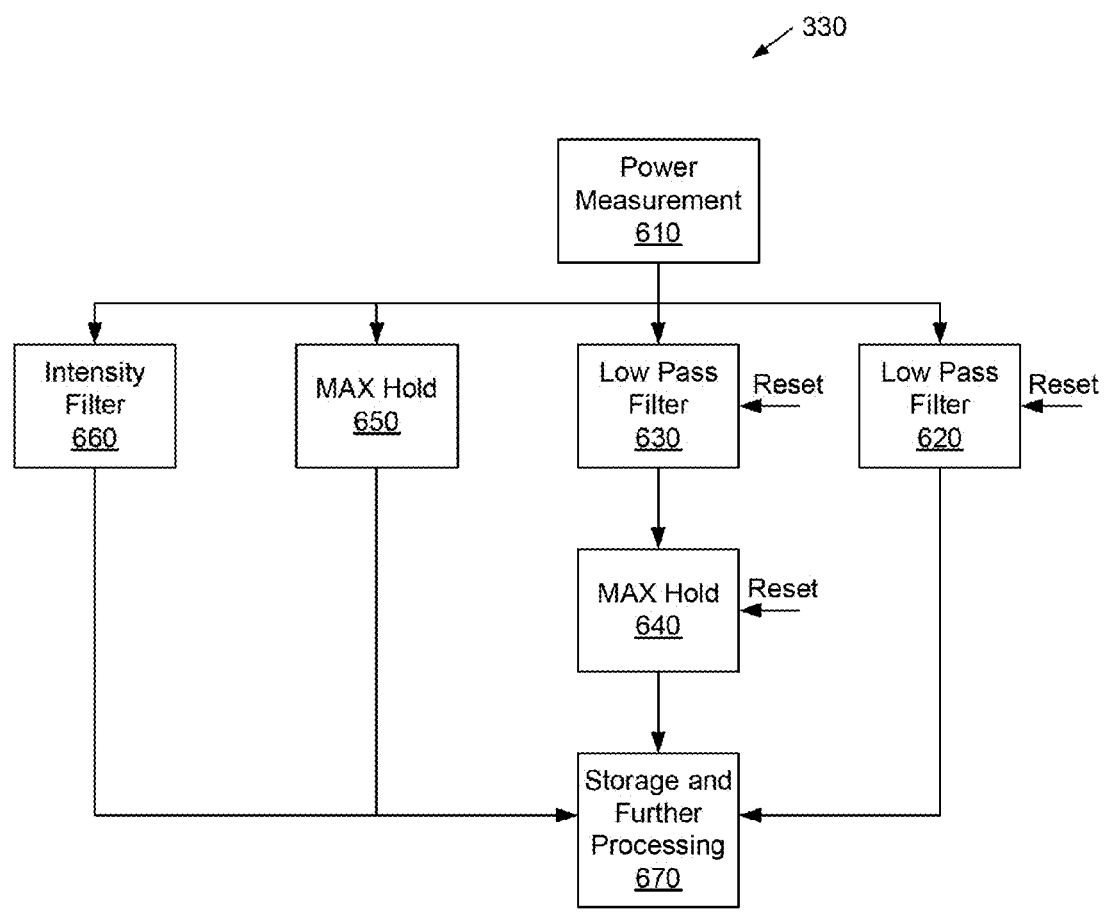
FIG. 6 shows an exemplary embodiment of measurement pre-processing device for use in the system according to the present invention.

The pre-processing step in FIG. 3 is further exemplified in FIG. 6.

The references in FIG. 6 have the following meaning:
610: Power Measurement
620: Low Pass Filter
630: Low Pass Filter
640: MAX Hold
650: MAX Hold
660: Intensity Filter
670: Storage and Further Processing Data pre-processing is an optional function, with the intent to reduce the data flow. This makes it possible to reduce the requirements on storage and processing power. There are four proposed steps:
1) Max Hold
2) Filter and Max Hold. Low pass filter
3) Low pass filter, set to average the power over the measurement interval.
4) Intensity filter The purpose of the filter in 2) is to maximize the response to WLAN beacon power signature. This can be done by means of tuning the impulse response to beacon length. In this way, the relatively long WLAN-beacon can be distinguished from briefer other interferences. This assumes that there are multiple power measurements per beacon.

The low pass filter is another alternative data reduction technique, and can be implemented by means of the median, average, or any other known filter in the art.

The intensity filter compares the measured power to a threshold, and the logical result ('1' or '0') is averaged in time.

Interference Presence Detection and Identification

There are two methods for detection and classification presented here:
1) Using pre-processed data;
2) Using the full data set.

First, the pre-processed data allows for straightforward thresholding. The determined max-hold power value is compared to a pre-defined threshold. Upon exceeding the threshold, the respective frequency is declared occupied. Such a technique discriminates very little according to the type of interference. Note that, if used, the NBP-WBP discriminator has already done pre-classification, so that the probability of exceeding the threshold from non-WLAN sources has been reduced.

Figure 7:
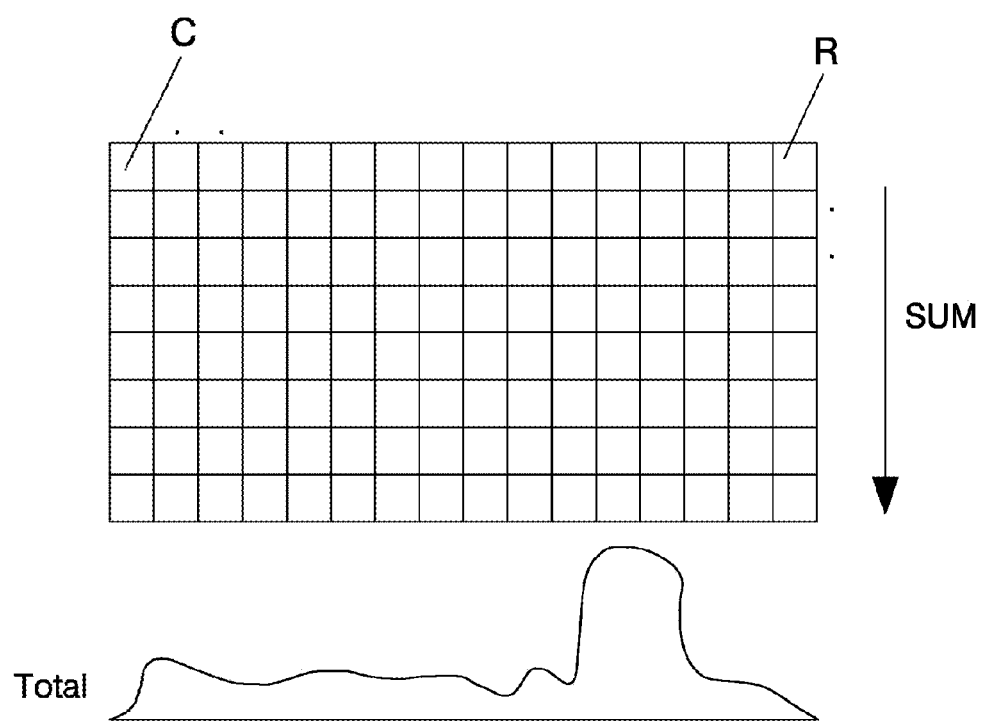
FIG. 7 shows an exemplary embodiment of a method for data collection and processing for use in the system according to the present invention.

To further make use of the known beacon repetition rate, method 2) collects the sequential unpreprocessed power measurements, and organizes them in a matrix form, the matrix consisting of a plurality of columns C and rows R, by writing data row by row as depicted schematically in FIG. 7. Rows present about 100 ms of data. Each position corresponds to 100 μs and holds a value, e.g. NBP, WBP, WBP−NBP or logical values, e.g. WBP−NBP>threshold. So each row corresponds to 1000 positions (only the first 10 are depicted in FIG. 7) It should be noted that the value of 100 μs is only exemplary and that according to the invention also other values can be used.

WLAN beacons with the known repetition rate will show up in vertically adjacent fields in this matrix. The sum of the columns is calculated. This is schematically depicted in FIG. 7. Adjacent columns may be grouped. It should be noted that the last and the first column in the matrix are adjacent in time. Peak values are detected and compared to a threshold. Strong (relative) peaks indicate the presence of WLANs.

Figure 8:
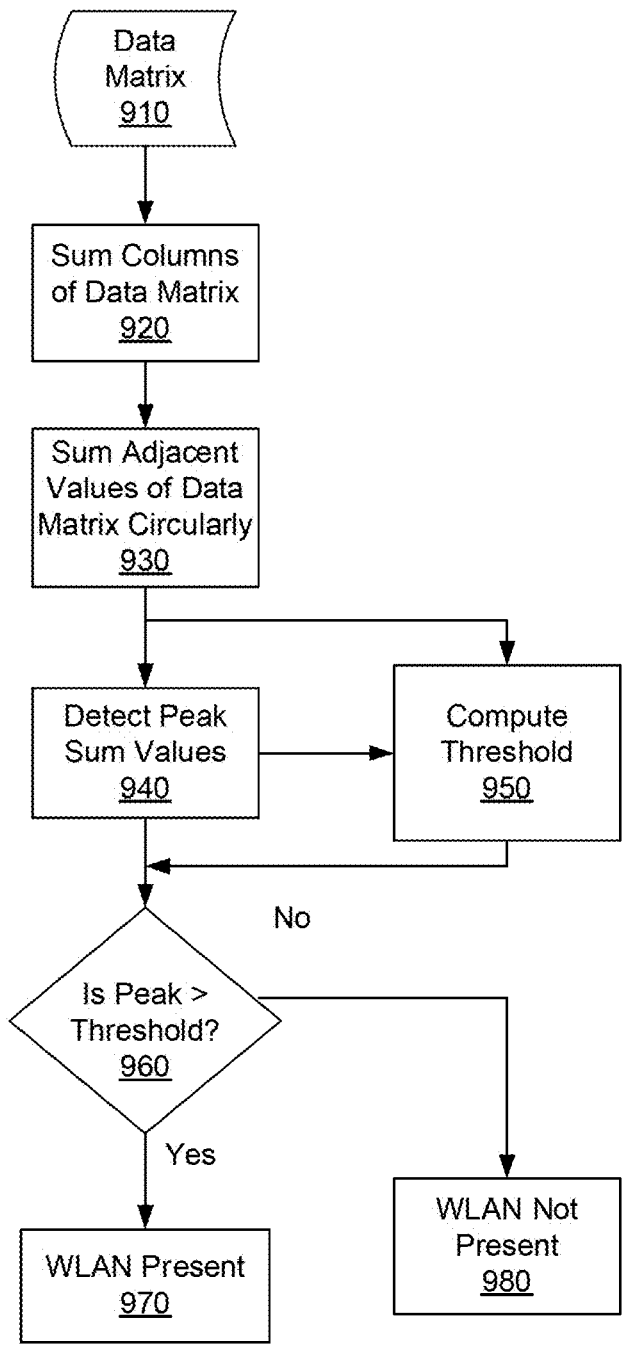
FIG. 8 shows an exemplary embodiment of WLAN beacon detection method for use in the system according to the present invention.
Figure 9:
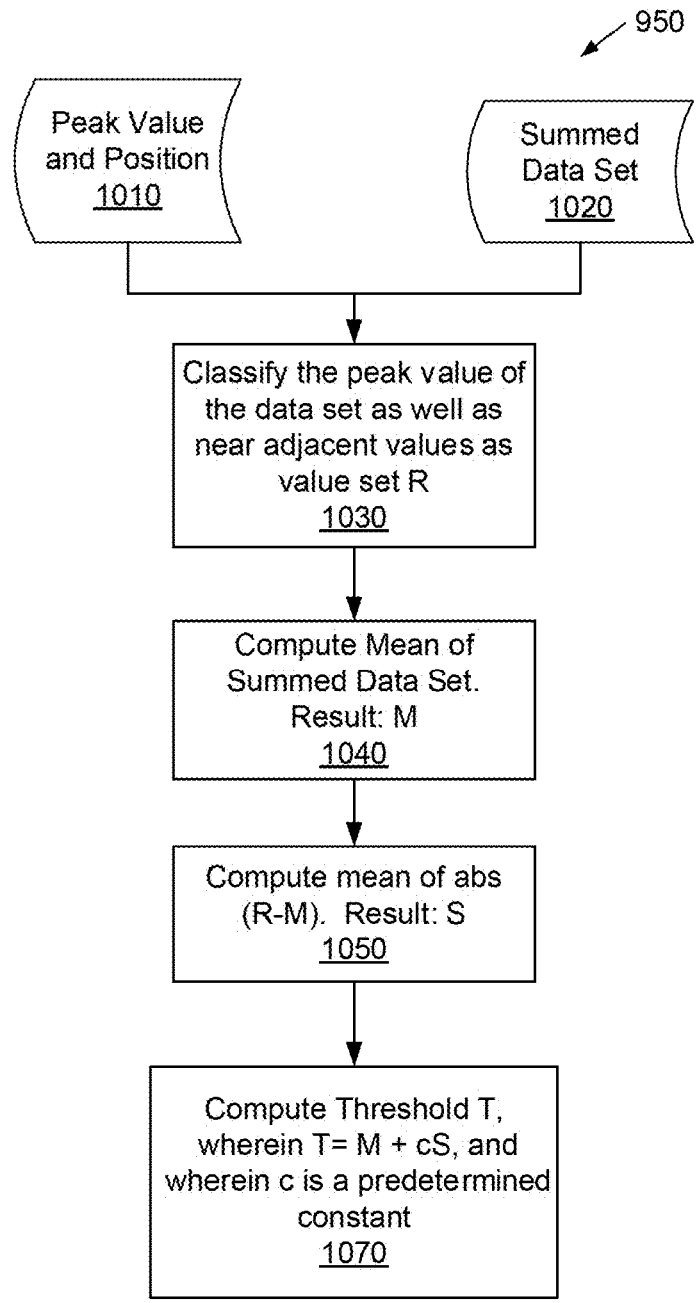
FIG. 9 shows an exemplary threshold determination method for use in the system according to the present invention.

The next step is to process the data such that WLAN beacons are positively discriminated. Correlation methods are well-suited for this. The correlation in FIG. 8 requires a low level of processing complexity. The references in FIG. 8 have the following meaning:
910: Data Matrix
920: SUM columns
930: SUM adjacent values circularly
940: Detect Peak
950: Compute Threshold
960: Peak>Threshold
970: WLAN present
980: WLAN not present Summing adjacent columns together allows small alignment differences between the actual rate of beacon and the assumed rate. A low complexity of the computation of the threshold is depicted in FIG. 9. The references in FIG. 9 have the following meaning:
1010: Peak value and position
1020: Summed data set
1030: Remove the peak from the data set, as well as near adjacent values. Result: R
1040: Compute mean of summed data set. Result: M
1050: Compute mean of abs(R−M). Result: S
1070: Threshold: M+cS, wherein c is a predetermined constant The threshold varies as a function of the total noise over a certain time period. The threshold computation shown in FIG. 9 is exemplary. A vast array of detection methods are at the designer's disposal.

Method 2 can be made suitable for any interferer repetition rate by adjusting the row length. Variations in rate can be compensated by summing less or more adjacent columns. Accuracy can be improved by adding rows. The method is extendible to multiple WLAN (wifi) beacon detection, i.e., on the basis of multiple-peak detection.

Channel Assignment

In the final channel assignment there are two decisions to be taken:
1) To determine the set of allowed frequencies
2) To determine on which frequency to initiate/continue transmissions.

Figure 10:
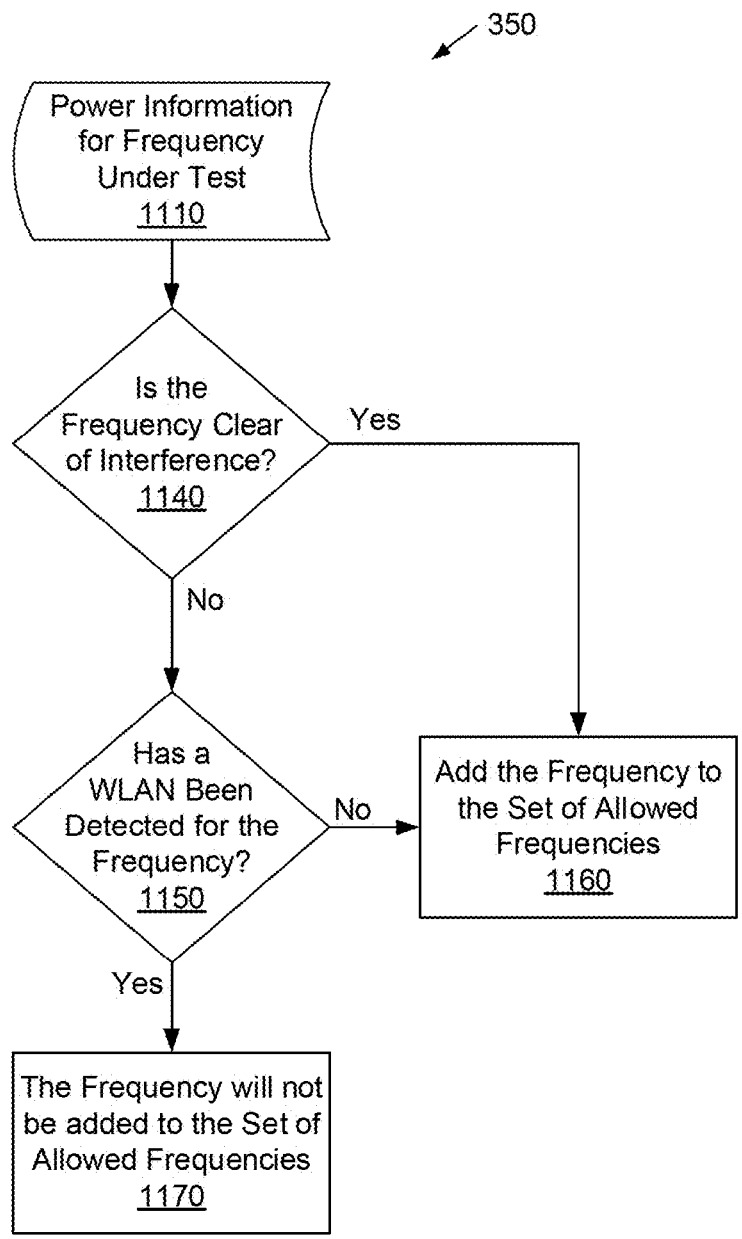
FIG. 10 shows the Channel Assignment according to an embodiment of the invention.

Step 1) is depicted in FIG. 10. The references in FIG. 10 have the following meaning:
1110: Power info for frequencies under test
1140: Absent of Interference?
1150: Wifi (WLAN) present?
1160: Store as allowable frequency
1170: The frequency will not be stored as allowable All frequencies are evaluated. Those clear of interference are added to the set of allowed frequencies. Those with interference are only allowed if no WLAN has been detected.

Figure 11:
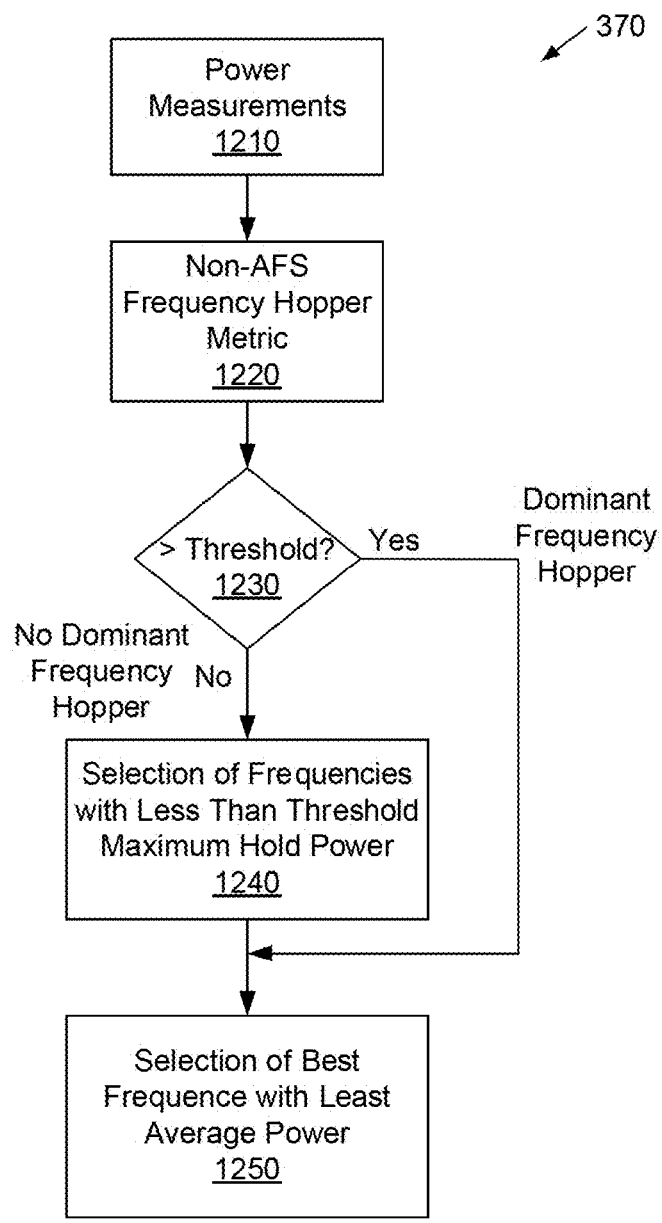
FIG. 11 shows an exemplary embodiment of a frequency allocation device for use in the system according to the present invention.

Further classification can be obtained by integrating the information from all observed frequencies. A full-band frequency hopper (FH) will yield similar power measurements in all bands. Therefore, when all frequencies show consistency to a pre-defined level, interference is classified as frequency hopper only. If any frequency shows a substantial increase over (the mean of) the others, that frequency is a likely candidate for WLAN. The flow diagram for this is depicted in FIG. 11. The references in FIG. 11 have the following meaning:

1210: Power Measurements
1220: Non-AFS frequency hopper Metric
1230: Optional: >Threshold
1240: Selection of Frequencies with less than Threshold Max Hold Power
1250: Selection of best frequency with least average power Step 2) takes the set of allowed frequencies as input. The frequency selected is the one with the least average interference. If the set is empty, the system may overrule the list and allocate one or more frequencies, for instance also based on a least average interference criterion.

Figure 12:
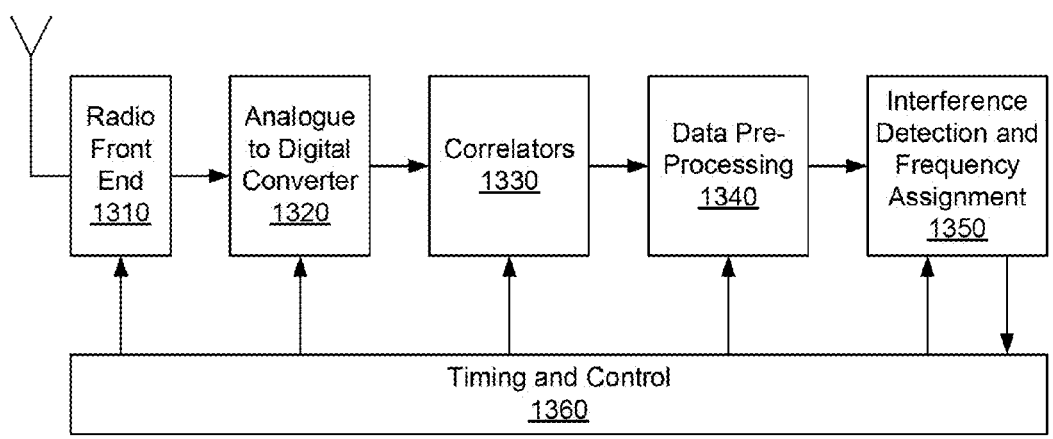
FIG. 12 shows an exemplary block diagram of the system according to the present invention.

FIG. 12 shows an exemplary block diagram of a system according to the present invention. In this diagram block 1310 represents a radio front end, block 1320 represents the Analogue to Digital Converter, block 1330 represents the correlators, block 1340 represent the data pre-processing, block 1350 represents the interference detection and frequency assignment and block 1360 represents the timing and control. The functionality of blocks 1310-1330 is implemented in hardware. The functionality of blocks 1340-1360 may be implemented in hardware or software.

The functionality shown FIG. 4 is implemented in blocks 1310-1330. The functionality shown in FIG. 5 is implemented in block 1330. The functionality shown in FIGS. 6-9 is implemented in block 1340. The functionality shown in FIGS. 10-11 is implemented in block 1350.

The system according to the present invention is optimized for, but not limited to, a digitally modulated non-frequency hopping wireless audio system.

As will be recognized by those skilled in the art, the innovative concepts described in the present application can be modified and varied over a wide range of applications.

Accordingly, the scope of patented subject matter should not be limited to any of the specific exemplary teachings discussed, but is instead defined by the following claims.

Any reference signs in the claims shall not be construed as limiting the scope thereof.

The invention claimed is:

1. A system comprising an interference detection means for detecting interference on wireless radio frequencies, wherein the interference detection means comprises a discrimination means for:
   discriminating between interference caused by a Wireless Local Area Network, herein after referred to as WLAN, and interference caused by other radio applications;
   discriminating between interference from a narrowband source and interference from a broadband source, wherein when the discrimination means determines a detected interference is from a broadband source the discrimination means determines the detected interference is caused by a WLAN; and
   wherein the interference detection means is adapted for measuring a total interference in a frequency band of interest and an aggregate interference from narrowband signals in the frequency band of interest, and wherein the discrimination means is adapted for determining the difference between the total interference and the aggregate interference and based thereon deducing if the detected interference is from a narrowband source or a broadband source.

2. A system comprising an interference detection means for detecting interference on wireless radio frequencies, wherein the interference detection means comprises a discrimination means for:
   discriminating between interference caused by a Wireless Local Area Network, herein after referred to as WLAN, and interference caused by other radio applications;
   discriminating between interference from a narrowband source and interference from a broadband source, wherein when the discrimination means determines a detected interference is from a broadband source the discrimination means determines the detected interference is caused by a WLAN; and
   wherein the discrimination means comprises a correlator for measuring correlations of power measurements over delay times that are small compared to a main lobe of an autocorrelation of a WLAN signal and that are large compared to the main lobe of the autocorrelation of a WLAN signal, wherein the discrimination means is adapted for discriminating between narrowband and broadband interference from the measured correlations.

3. A system comprising an interference detection means for detecting interference on wireless radio frequencies, wherein the interference detection means comprises a discrimination means for:
   discriminating between interference caused by a Wireless Local Area Network, herein after referred to as WLAN, and interference caused by other radio applications;
   discriminating between interference from a narrowband source and interference from a broadband source, wherein when the discrimination means determines a detected interference is from a broadband source the discrimination means determines the detected interference is caused by a WLAN; and
   wherein the discrimination means comprises an intensity filter for filtering interference statistics, wherein the intensity filter comprises:
   a comparator for comparing the interference statistics against a threshold resulting in a logical result at the output of the comparator which is indicative of surpassing or not of the threshold; and
   a filter averaging the logical result over time.

* * * * *